Figure 1:
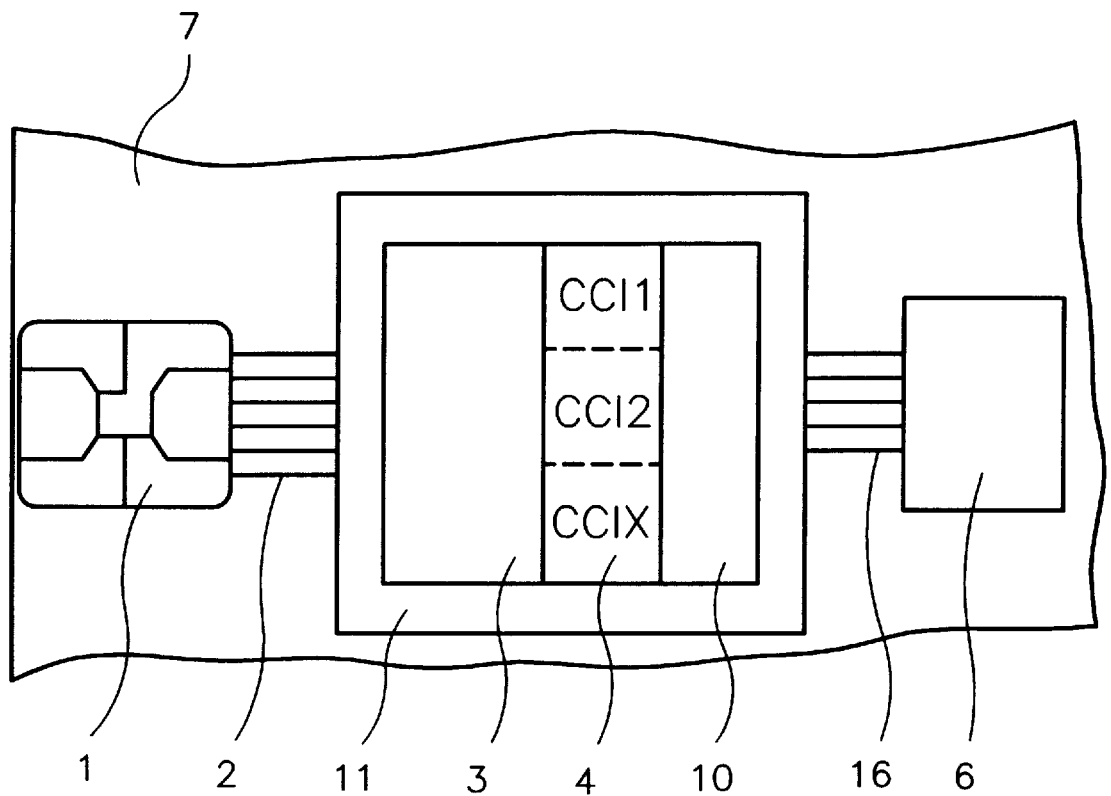

United States Patent [19]
Kreft et al.

[11] Patent Number: 6,098,890
[45] Date of Patent: Aug. 8, 2000

[54] METHOD AND DEVICE FOR ADAPTING A CHIP CARD TO DIFFERENT CARD TERMINALS

[75] Inventors: Hans-Diedrich Kreft, Dassendorf; Michael Jenning, Hamburg; Ingo Bade, Bad Oldesloe; Jürgen Wesenberg, Hamburg, all of Germany

[73] Assignee: Angewandte Digital Elektronik GmbH, Dassendorf, Germany

[21] Appl. No.: 09/000,430

[22] PCT Filed: Mar. 20, 1996

[86] PCT No.: PCT/DE96/00527

§ 371 Date: Jan. 30, 1998

§ 102(e) Date: Jan. 30, 1998

[87] PCT Pub. No.: WO96/29673

PCT Pub. Date: Sep. 26, 1996

[30] Foreign Application Priority Data

Mar. 20, 1995 [DE] Germany ............... 195 09 517

[51] Int. Cl.[7] .................................................. G06K 19/06
[52] U.S. Cl. .......................... 235/492; 235/449; 235/493; 340/825.31
[58] Field of Search .................. 235/492, 476, 235/493, 449, 451; 340/825.31, 10.3, 10.4, 69, 72

[56] References Cited

U.S. PATENT DOCUMENTS

| | | | |
|---|---|---|---|
| 4,822,900 | 4/1989 | Tamada et al. | 235/492 |
| 4,822,988 | 4/1989 | Gloton | 235/492 |
| 5,049,728 | 9/1991 | Rovin | 235/492 |
| 5,206,495 | 4/1993 | Kreft | 235/492 |
| 5,444,222 | 8/1995 | Inoue | 235/492 |
| 5,585,617 | 12/1996 | Ohbuchi et al. | 235/491 |
| 6,011,483 | 1/2000 | Tanaka | 340/825.31 |

FOREIGN PATENT DOCUMENTS

| | | |
|---|---|---|
| 0159539 | 10/1985 | European Pat. Off. . |
| 0552828 | 7/1993 | European Pat. Off. . |
| 0617369 | 9/1994 | European Pat. Off. . |
| 0642096 | 3/1995 | European Pat. Off. . |
| 9208724 | 8/1992 | Germany . |
| 4327334 | 1/1995 | Germany . |
| 2237479 | 5/1991 | United Kingdom . |

*Primary Examiner*—Donald Hajec
*Assistant Examiner*—Daniel St. Cyr
*Attorney, Agent, or Firm*—Horst M. Kasper

[57] ABSTRACT

A Method and device for recognizing card terminals which include a plurality of chip cards wherein each chip card includes a plurality of function components, recognizing circuit, and electronic circuitry with contactless connection. The card terminals differ from one another by emitting electromagnetic waves having different physical properties. When a chip card recognizes a particular terminal, a specific function component is activated according to the particular terminal.

21 Claims, 2 Drawing Sheets

METHOD AND DEVICE FOR ADAPTING A CHIP CARD TO DIFFERENT CARD TERMINALS

TECHNICAL AREA

The invention relates to a process for adapting chip cards to different card terminals that exchange energy and data with the chip cards by means of electromagnetic waves, whereby the chip cards comprise an electronic circuit, contactless connection means such as coils, capacitors, photosensitive layers or oscillating circuits, all of which are electrically connected to each other, and the invention also relates to a device according to the generic parts of claims 1 and 5.

STATE OF THE ART

Cards used nowadays can obtain the energy needed for their operation from the electromagnetic field surrounding them in the vicinity of a terminal. They can also function independently of the surrounding electromagnetic field in that the card is supplied by an embedded source of electric energy such as a battery or capacitor, or by a portable device into which the card is inserted. Such cards are used for numerous applications such as, for example, telephone cards, medical cards or access control cards. An overview of such cards and their applications is compiled in three editions of the publication "Elektronik" from the year 1993.

A chip card is known from DE 39 35 364 C1 which contains contacts and contact-free transmission elements. DE 43 27 334 C1 describes a contactless chip card having two transmission coils or capacitor plates which autonomously recognizes whether it is operating in close proximity to a terminal, for which purpose a "stereo effect" is utilized. With this effect, on the one hand, it is only possible to change certain data on the card when the card is inserted into a read/write device and, on the other hand, this access is prohibited when the card is addressed remotely.

In the case of processes that utilize the evaluation of transmitted logical information, such as commands, protocols and encoding, and that start the programs in cards externally via fed-in information, it is possible to feed extensive information into the card before the card can block itself The entering of undesired programs or program fragments such as program viruses into chip cards with the aim of having the cards carry out functions such as, for example, transferring funds to anonymous bank accounts, will pose a risk in the future, especially with chip cards that operate contact-free. Such processes are not adequately secured against undesired data transmissions between the card and the terminal. The known chip cards are not yet sufficiently secure against external manipulation.

GB-A 2,237,479 described a contactless IC card comprising a microprocessor, storage device as well as an antenna for bi-directional data transmission. The chip card is capable of evaluating the physical properties of received electromagnetic waves on the basis of the amplitudes, whereby the amplitude of the waves differs from one card terminal to the next. Depending on this evaluation, different function components with special functions are activated, whereby however, the card function remains the same in all cases.

EP-A 0,159,539 has described a chip card system which serves as a money substitute, as an identification or as a storage medium, in which one single chip card can be used consecutively for different application cases. Different areas of a storage device integrated in the chip or of a functional unit are provided for the various application cases. In order to select the different areas in the chip, there is a selection circuit in the chip for which a certain selection procedure is defined by means of which it can be ensured that the areas relevant for the application case in question and only these are allocated. This is done on the basis of the information conveyed by an input/output device which is modulated upon a carrier wave. Thus, through the different information transferred, different card functions can be activated for different application cases.

TECHNICAL OBJECTIVE

The invention is based on the objective of creating a process and a device such that one and the same chip card can interact with different card terminals at a high level of security against external manipulation while carrying out totally differing functions.

DISCLOSURE OF THE INVENTION AND OF ITS ADVANTAGES

The objective is achieved according to the invention in that the electromagnetic waves emitted by different card terminals differ in terms of one or more physical properties such as frequency, phase, energy density, amplitude, etc., and in that the chip card recognizes the electromagnetic waves received from the different card terminals on the basis of these different physical properties, and then different card functions of the chip card are activated, depending on the card terminal recognized in that particular case.

Thus, in an advantageous manner, the activation of one or more functions of the chip card does not occur through the evaluation of the information modulated upon or to the carrier wave but rather on the basis of differing physical properties of the electromagnetic waves of different card terminals themselves. As a result, such cards have a high degree of security against external manipulation since, in order to recognize the function that the card is to carry out, there is no need for transmitted logical information such as commands, protocols or encoding, all of which could be manipulated.

A device consisting of chip cards and card terminals that are capable of exchanging energy and data with the chip cards by means of electromagnetic waves, whereby the chip cards comprise an electronic circuit, contactless connection means such as coils, capacitors, photosensitive layers or oscillating circuits or optionally an electric energy storage device, such as an accumulator or battery, all of which are electrically connected to each other, characterized in that, in order to adapt one and the same chip card to different card terminals, the electromagnetic waves emitted by said terminals differ in terms of one or more physical properties such as frequency, phase, energy density, amplitude, etc., whereby the electronic circuit of the chip card has a circuit component that recognizes the received electromagnetic waves according to their differing physical properties and, depending on the card terminal recognized in that particular case, activates different card functions of the chip card. The energy input and the data exchange of the chip card take place in accordance with the special function of the function component activated in that particular case.

For example, chip cards are in circulation which contain electronic chips that carry out contact-free functions according to stipulated international standards (according to ISO Standard 10536) as well as cards whose electronic chips do not meet these standards but that have utilization advantages such as a greater contact-free range. If the two chips of these cards—one in compliance with the standards and one not in compliance with the standards—are combined on one card according to the invention, and if such a card is brought into the vicinity of different, appropriately adapted terminals, then the card can autonomously recognize which terminal and thus which case is applicable as well as whether and how it should become active in the electromagnetic sphere of influence of the terminal in question.

For example, the card that is in compliance with the standards can import and store units of money or person-related data from a terminal, whereas these activities are precluded at this same terminal for a card that is not in compliance with the standards. It can be desirable to make it possible to convey information over large distances when a person enters a bus or in order to open a gate without compliance with an international standard. The autonomous recognition of the case at hand and the selection of the suitable process for data and/or energy exchange between the terminal and the card takes place by means of electronic circuits on a card through the evaluation of physical characteristics of the electromagnetic waves which occur in the surroundings of the card. Thus, the selection of the process is not made by evaluating information that was entered into the electromagnetic oscillations in the terminal by frequency or amplitude modulation, phase shift or the like via logical circuits or programs. In these cases, an extensive interaction between the card and the terminal will need to have taken place before the card can block itself Several different or identical electromagnetic waves can also be simultaneously emitted by a terminal and simultaneously received by the chip card separately and evaluated and vice-versa. In this manner, a chip card can determine whether it is close to or far from the electromagnetic field of a terminal.

Figure 2:
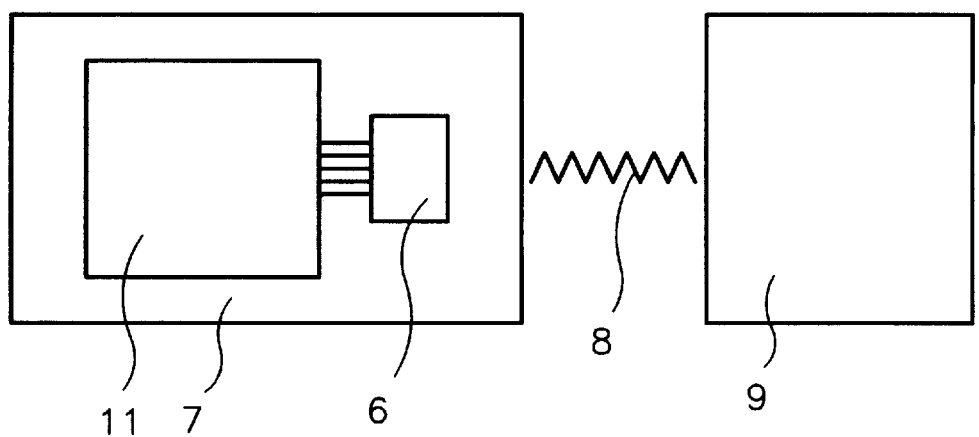
Figure 3:
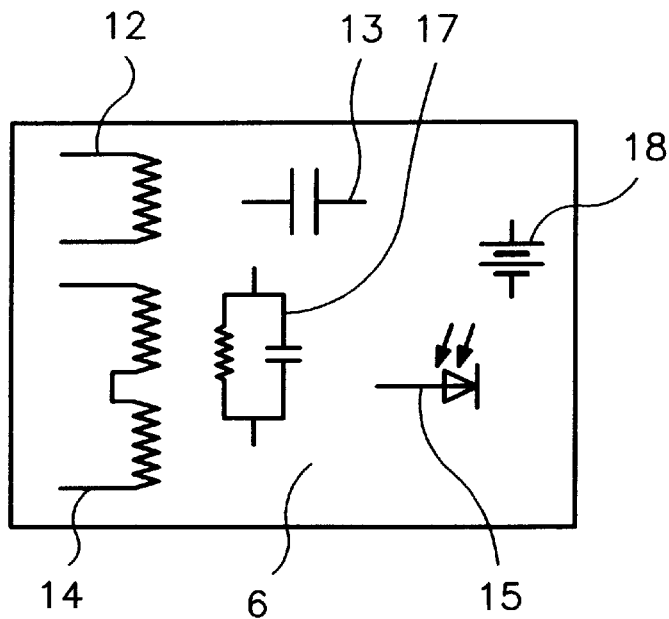
Figure 4:
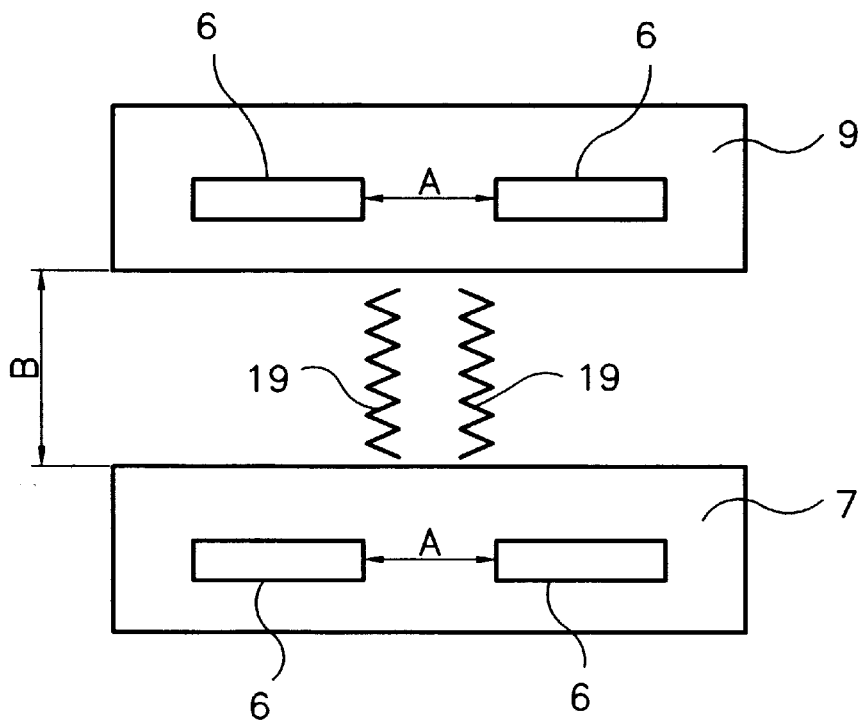

A short description of the drawings, which show the following:

FIG. 1 a schematic representation of the contact surfaces of a chip card that is connected to an electronic circuit via electrically conductive connections, FIG. 2 a chip card with connection means in an electromagnetic field emitted by a terminal, FIG. 3 individual receiving and transmitting elements such as coils, capacitors, photo-sensitive layers and/or oscillating circuits which can be contained in the connection element in various combinations and FIG. 4 a terminal and a chip card, each with two identical connection means at a distance A on the sides of the terminal and of the chip card.

PREFERRED EMBODIMENT OF THE INVENTION

FIG. 1 schematically shows contact surfaces 1 of a chip card 7 which is connected to an electronic circuit 11 via electrically conductive connections 2. The circuit 11 is connected to connection means 6 via electrically conductive connections 16 for the contactless reception of electromagnetic waves 8 which are depicted symbolically in FIG. 2. The circuit 11 contains the microcontroller 3 and an electronic circuit component 4 which, in turn, contains several electronic function components CCI1, CCI2 to CCIx, whereby CCIx stands for the possibility of using additional such function components. The circuit 11 comprises another electronic circuit component 10 that can be connected, on the one hand, to the function components CCI1, CCI2 to CCIx and, on the other hand, directly to the connection means 6 via the connections 16. FIG. 2 shows the chip card 7 with the connection means 6, and said chip card 7 is located in the electromagnetic field of the electromagnetic wave 8 emitted by a terminal 9. FIG. 3 shows individual receiving and transmitting elements on the chip card 7 such as coils 12, 14, capacitors/condensers 13, photosensitive layers 15 or oscillating circuits 17 as well as electrical storage devices 18 such as accumulators or batteries, whereby all of the elements can be present in the connection element 6 in various combinations.

The electromagnetic waves 8 emitted by a specific terminal 9 are received in the connection means 6 of the chip card 7 and evaluated within the circuit component 10 of the circuit 11 on the basis of one or more physical characteristics of the wave 8 such as frequency, phase, energy density, amplitude, chopping status, etc. Based on the result of the evaluation, one or more of the electronic function components CCI1, CCI2 to CCIx are activated; the energy input and the data exchange of the chip card 7 with the terminal 9 now take place in accordance with the special function of the function components CCI1, CCI2 to CCIx activated in that particular case.

The electromagnetic waves emitted by another terminal for one and the same chip card 7 differ from those of terminal 9 in terms of one or more physical characteristics, whereby these different waves from the other terminal are detected within the circuit 10 of the chip card 7 and are allocated to the function component CCI1 or CCI2 or up to CCIx now to be activated, after which a correspondingly different function of the activated function component CCI1 or CCI2 or up to CCIx is carried out.

FIG. 4 shows the circumstances between terminal 9 and card 7 for the case when two identical connection means 6 are present at a distance A on the sides of the terminal 9 as well as on the sides of card 7. Card 7 and terminal 9 are at a distance B from each other. Two separate electromagnetic waves 19, which can be the same or different, are simultaneously transmitted over a distance B and they are received separately but simultaneously by the chip card 7. In this manner, electronic components of the chip card 7 can recognize the distance B between the card and the terminal by means of the "stereo effect" described in DE 43 27 334 C1, and they can determine whether the card is close to or far from a terminal 9.

In order to make bi-directional data transmission possible, the components for the data reception of the chip card can also be provided in an analogous manner in the card terminal, so as to analogously receive electromagnetic waves emitted by the chip card as well as data from the chip card.

COMMERCIAL APPLICABILITY

The subject matter of the invention is especially suitable for commercial applications, on the one hand, for purposes of adapting chip cards to several different card terminals and, on the other hand, for purposes of securing the chip cards against external manipulation. The usefulness of the invention lies especially in the fact that, in order to recognize the function that the card is to carry out, there is no need for transmitted logical information such as commands, protocols or encoding, all of which could be manipulated. The entering of undesired programs or program fragments such as program viruses with the aim of having the cards carry out functions such as, for example, transferring funds to an anonymous bank account, is made considerably more difficult or practically impossible with the process according to the invention and with the chip card according to the invention.

What is claimed is:

1. A process for recognizing card terminals using chip cards comprising: emitting different electromagnetic waves from a plurality of card terminals, wherein each of the card terminals differs from another card terminal in terms of one or more physical properties of a member selected from a group consisting of frequency, phase, energy density, and amplitude; providing chip cards for simultaneously receiving and recognizing the different electromagnetic waves from the different card terminals based on these different physical properties; exchanging energy and data between the card terminals and the chip cards by means of the electromagnetic waves, wherein each chip card comprises an electronic circuit and contactless connection means, and wherein the electronic circuit and the contactless connection means are electrically connected to each other; and activating different functions of the chip cards depending on the card terminals recognized by the chip cards.

2. The process for recognizing card terminals using chip cards according to claim 1, wherein the contactless connection means are provided by a member selected from a group consisting of coils, capacitors, photosensitive layers, and oscillating circuits.

3. The process for recognizing card terminals using chip cards according to claim 1, further comprising performing energy input and data exchange of the chip cards in accordance with special functions of function components activated in order to achieve different functions of the chip cards.

4. The process for recognizing card terminals using chip cards according to claim 1, further comprising evaluating different emitted electromagnetic waves separately and simultaneously by the chip cards.

5. The process for recognizing card terminals using chip cards according to claim 1, further comprising providing energy to the chip cards by additional electric energy storage devices contained in the chip cards in order to carry out activating different functions of the chip cards.

6. The process for recognizing card terminals using chip cards according to claim 5, wherein the additional electric energy devices are members from a group selected from accumulators and batteries.

7. A device comprising chip cards for simultaneously receiving different electromagnetic waves, each chip card includes an electronic circuit and contactless connection means, wherein the electronic circuit of each chip card has a circuit component that recognizes the electromagnetic waves according to differing physical properties, and wherein the electronic circuit and contactless connection means are electrically connected to each other; and card terminals for emitting the electromagnetic waves which are different in terms of one or more physical properties of a member selected from a group consisting of frequency, phase, energy density, and amplitude, in order to adapt a predetermined chip card to different card terminals, wherein the circuit component activates different functions of a predetermined chip card depending on a card terminal recognized by the predetermined chip card, wherein the card terminals exchange energy and data with the chip cards by means of electromagnetic waves.

8. The device according to claim 7, wherein the contactless connection means is provided by a member of a group selected from coils, capacitors, photosensitive layers, and oscillating circuits.

9. The device according to claim 7, wherein different function components of the electronic circuit of each chip card is activated in order to achieve different functions of a chip card based on a recognition signal, and energy input and data exchange of the chip card takes place in accordance with a special function of a function component activated in a particular case.

10. The device according to claim 7, wherein components of each chip card are provided in the card terminal in order to analogously receive electromagnetic waves emitted by each chip card, thereby furnishing a bidirectional data transmission.

11. The device according to claim 7, wherein two identical connection means are disposed at a prescribed first distance on a chip card, and wherein a card terminal and/or the chip card transmits two separate electromagnetic waves over a second distance, and wherein the chip card and/or the terminal receives simultaneously the two separate electromagnetic waves.

12. The device according to claim 7, wherein said device additionally contains an electric energy storage device.

13. The device according to claim 12, wherein said electric energy devices is a member of a group selected from accumulator and battery.

14. A process for adapting chip cards (7) to card terminals (9) that exchange energy and data with the chip cards (7) by means of electromagnetic waves (8, 19), wherein the chip cards (7) comprise electronic circuits (11) including recognizing circuits, contactless connection means (6) of a member selected from a group consisting of coils (12, 14), capacitors (13), photosensitive layers (15), and oscillating circuits (17), which are electrically connected to each other, characterized in that the electromagnetic waves (8, 19) emitted by different card terminals (9) differ in terms of one or more physical properties consisting of frequency, phase, energy density, and amplitude; each chip card simultaneously receiving different electromagnetic waves and recognizing the different electromagnetic waves (8, 19) received from the card terminals (9) based on the different physical properties; activating different functions of a chip card (7) depending on a particular card terminal (9) recognized by a chip card.

15. The process according to claim 14, characterized in that, activating different functions of the chip card (7) based on a recognition signal, wherein energy input and data exchange of the chip card (7) take place in accordance with a special function of a function component (CCII, CCI2, CCIx) being activated.

16. The process according to claim 14, characterized in that different electromagnetic waves are simultaneously emitted by the card terminals (9) and received and evaluated separately and simultaneously by the chip cards (7).

17. The process according to claim 14, characterized in that, in order to carry out said process, the chip card (7) additionally contains an electronic energy storage device (18).

18. A device consisting of chip cards (7), for simultaneously receiving different electromagnetic waves, and card terminals (9) for emitting the different electromagnetic waves, wherein energy and data are exchanged between the chip cards (7) and the card terminals by means of electromagnetic waves (8, 19), the chip cards (7) comprise electronic circuits (11), contactless connection means (6) of a member selected from a group consisting of coils (12, 14), capacitors (13), photosensitive layers(15), and oscillating circuits (17), which are electrically connected to each other, characterized in that, in order to adapt one chip card (7) to different card terminals (9), the electromagnetic waves (8,19) emitted by said terminals (9) differ in terms of one or more physical properties consisting of frequency, phase, energy density, and amplitude, wherein the electronic circuits (11) of the chip cards (7) have circuit components (10) that recognize the received electromagnetic waves (8, 19) according to their differing physical properties; and the chip cards include function components for activating different functions of the chip cards depending on a card terminal (9) recognized by a chip card (7).

19. The device according to claim 18 characterized in that, energy input and data exchange of the chip cards (7) take place in accordance with special functions of the function components (CCII, CCI2x) being activated.

20. The device according to claim 18, characterized in that, a bidirectional data transmission, components (3, 4, 6, 10, 11) of the chip cards (7) are provided in the card terminals (9) in order to analogously receive electromagnetic waves (8, 19) emitted by the chip cards (7).

21. The device according to claim 18, characterized in that, two identical connection means (6) are provided at a first prescribed distance (A) in the chip cards and/or in that the card terminal (9) which transmit simultaneously two separate electromagnetic waves (8, 19) over a second prescribed distance (B), wherein the chip card (7) and/or the terminal (9) simultaneously receives the two separate electromagnetic waves (8, 19).

* * * * *